Jan. 23, 1951     L. B. COURTOT     2,539,120
TRIAXIAL CONTROL HANDLE FOR HELICOPTERS
Filed June 28, 1946

INVENTOR.
LOUIS B. COURTOT
BY
*Richey Watts*
ATTORNEYS

Patented Jan. 23, 1951

2,539,120

UNITED STATES PATENT OFFICE 2,539,120

TRIAXIAL CONTROL HANDLE FOR HELICOPTERS

Louis B. Courtot, Cleveland, Ohio, assignor to The Weatherhead Company, Cleveland, Ohio, a corporation of Ohio Application June 28, 1946, Serial No. 680,304

5 Claims. (Cl. 74—471)

This invention relates to a device for manipulating and controlling a plurality of valves or other control devices, the devices being adapted to control positively and simultaneously one or all of the three controlled members.

For example, in controlling a helicopter the operator must at all times have under complete control, the rotor, the rotor attack angle, and the tail propeller, and it is highly desirable that this control be effected by an arrangement like that of the conventional joy stick. However, control stick arrangements of the prior art have only been adapted to adjust two actions, this being deficient in many cases such as in helicopter control referred to above. It is an object of this invention to provide a simple pivoted control stick which gives motion in three planes or about three mutually perpendicular axes to positively adjust one or all of three valves at any time or in any position of the control stick.

It is another object of this invention to provide such a device in which the adjustments are positive and independent in the sense that regardless of the position of the stick or control handle a given valve can always be moved and, furthermore, it can be moved without affecting the other two valves, if so desired. I am aware that attempts have been made in the past to provide a triaxial control but such devices have been complicated and relatively flimsy in construction and some have required universal joints. In certain applications such as aircraft control, simplicity and ruggedness is of paramount importance. Accordingly, it is a further object of my invention to provide a simple dependable device which permits the necessary independent triaxial control without the use of any complicated structure and without the use of any universal joints or other inherently structurally weak mechanism to accomplish the desired result. The invention will be more fully described with reference to the accompanying drawings, in which:

Figure 1:
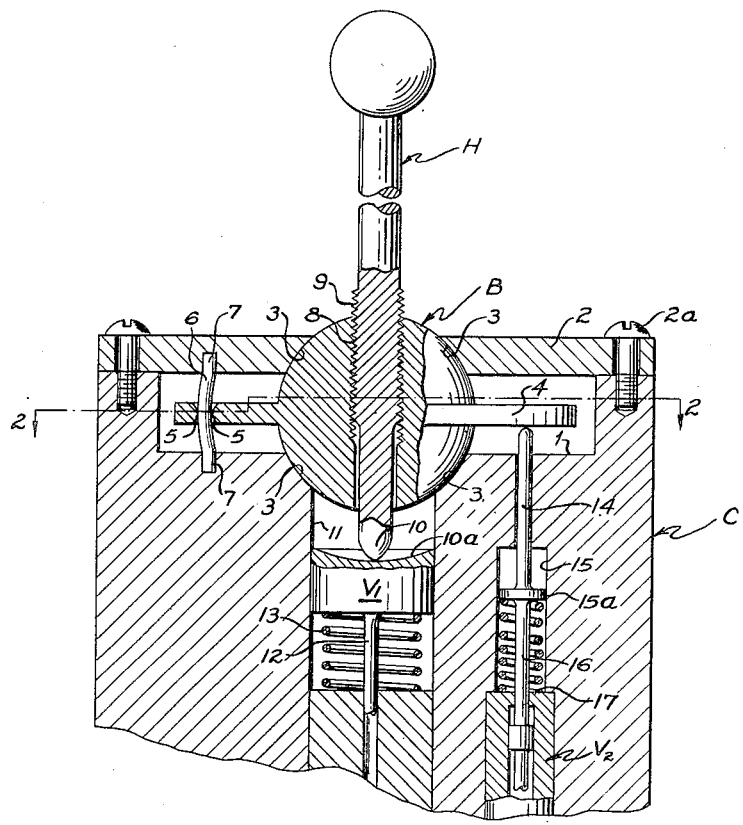
Fig. 1 is a vertical section through the control device.

The casing or housing member C is provided with a recess as at 1 to receive certain parts of the mechanism and provide clearance therefor. The recess may be closed by a cover plate 2 fastened by fasteners 2a in any convenient manner. Member C and the cover are formed with spherical surfaces 3 to pivotally receive ball member B. Fastened to, or integral with, the ball B is the actuating disc 4. At one point on the disc a waist-shaped or hourglass-shaped hole 5 is provided with relieved or torroidal surfaces which have line engagement with the curved pin 6, which pin is retained in the structure by end portions as at 7. The curvature of pin 6 has for its center the center of the ball so that as the ball is pivoted in one plane, there is no binding between the pin 6 and the disc 4. The waist shape of the aperture 5 in the plate permits the ball to be pivoted freely in the other plane.

The ball is threaded as at 8 to receive a threaded control handle which has mating threads 9 formed thereon. An extension portion 10 of the handle preferably has a rounded end and engages a spherical surface 10a on a valve member $V_1$ which member may slide in an aperture 11 and have a stem 12 to actuate the control valve or other member toward the member to be adjusted when control handle H is turned within the ball. Spring 13 keeps the head of $V_1$ against the extension 10 at all times. The purpose of pin 6 is to prevent the ball from merely spinning around within the housing when control handle H is turned to insure that turning the handle will operate $V_1$.

The second valve member $V_2$ is operated by a stem 14 passing through a bore in housing C and having a rounded end held in engagement with disc 4 by a spring. An aperture 15 may be provided to receive a piston 15a which is connected to the extension 16 for operating the valve or other adjusted member. The stem 14 is maintained in engagement with the disc 4 by means of spring 17.

Figure 2:
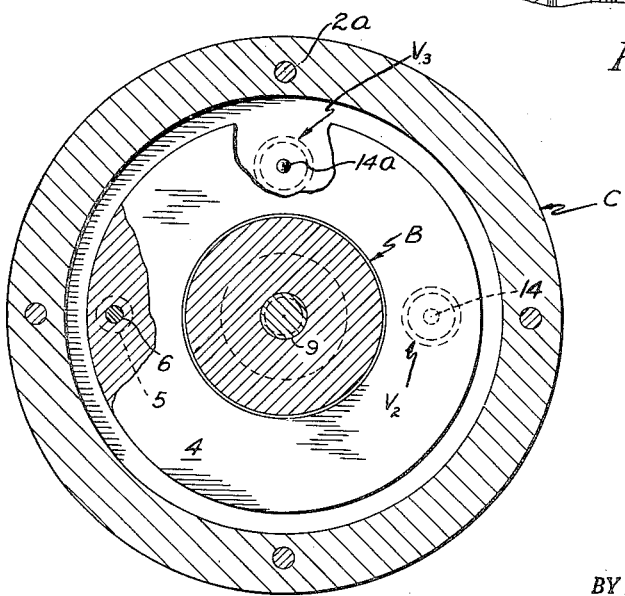
Fig. 2 is a section taken on 2—2 of Fig. 1.

As seen in Fig. 2, another structure $V_3$ may be provided 90° from that just described at $V_2$, the arrangement being such in this case that either $V_2$ or $V_3$ can be moved independently of one another by a proper tilting of the control handle and hence disc 4, and regardless of the position of the control handle one or both of $V_2$ or $V_3$ may be adjusted from that position. It can be further seen that since the surface 10a on $V_1$ is a portion of a sphere, tilting the handle will have no effect on $V_1$ but, on the other hand, $V_1$ can be adjusted at any time by merely rotating the handle H.

Having completed the description of my invention, those skilled in the art will understand that I have provided a rugged and dependable device of the utmost simplicity which provides for independent control or adjustment of three valves or other operated members. Although by way of example, I have shown and described my invention using a system wherein valves are adjusted, I contemplate that the same principles could be used to adjust any mechanical device providing their operators are maintained in contact with their respective operating members by springs or other means. Various design details such as the shape of the housing and the mounting of the valve members that I have shown are not critical and may be modified without departing from the spirit of the invention as defined in the appended claims. Although I prefer that member 4 be disc shaped for simplicity, it could be made up of separate fingers.

Having thus described the present invention so that others skilled in the art may be able to understand and practice the same, I state that what I desire to secure by Letters Patent is defined in what is claimed.

What I claim is:

1. A triaxial control unit comprising in combination a supporting member having an axial opening therein, a first control rod longitudinally movable in said axial opening, the upper end of said supporting member being counterbored to provide an annular recess and the junction of said bore with said counterbore being formed with a spherical concave surface, a cap secured to said supporting member enclosing said counterbore recess having a central aperture therein with a concave spherical inner surface, whereby a spherical socket is formed, a ball member movably fitting said spherical socket, transversely projecting means extending from said ball member having an opening therein, a curved holding rod extending through said opening and secured to said stationary member to prevent rotation of said ball member about the axis of said bore in the stationary member, second and third control rods mounted in said stationary member slidable parallel to the bore thereof and engaged by said transversely projecting means, a lever threaded through said ball member, said first slidable control rod having a pad secured to the upper end thereof with a concave upper surface adapted to be engaged by said lever and moved by rotation of said lever, tilting of said lever in one direction or another causing longitudinal motion of one or the other of said second or third slidable rods.

2. A triaxial control unit comprising a supporting member, a control member mounted therein with freedom of motion about two perpendicular axes, means for restraining motion of said control member around a third axis perpendicular to said first two axes, a threaded opening in said control member disposed along said third axis, a handle threaded in said opening, and three members mounted in said supporting member, one of said members slidably engaging said handle and responding to axial motion while permitting lateral motion thereof, another engaging said control member in a plane containing said third axis and one of said first-named two axes, and the third engaging said control member in a plane containing said third axis and the other of said two axes.

3. A triaxial control unit comprising a supporting member, a control member mounted therein with freedom of motion about two perpendicular axes, means for restraining motion of said control member around a third axis perpendicular to said first two axes, a threaded opening in said control member disposed along said third axis, a handle threaded in said opening, and three members movably mounted in said supporting member, one of said members having a concave spherical surface engaging said handle and another engaging said control member in a plane containing said third axis and one of said first-named two axes and the third engaging said control member in a plane containing said third axis and the other of said first-named two axes.

4. A triaxial control unit comprising a supporting member, a socket in said supporting member, a control member including a ball mounted in said socket with freedom of motion about two perpendicular axes, said control member including means projecting from said ball, means for restraining motion of said control member around a third axis perpendicular to said first two axes, a threaded opening in said control member disposed along said third axis, a handle threaded in said opening, and three members movably mounted in said supporting member, one of said members engaging said handle, another engaging the projecting means of said control member in a plane containing said third axis and one of said first-named two axes, and the third engaging the projecting means of said control member in a plane containing said third axis and the other of said two axes.

5. A triaxial control unit comprising a supporting member, a socket in said supporting member, a control member including a ball mounted in said socket with freedom of motion about two perpendicular axes, said control member including means projecting from said ball, means for restraining motion of said control member around a third axis perpendicular to said first two axes, a threaded opening in said control member disposed along said third axis, a handle threaded in said opening, and three members movably mounted in said supporting member, one of said members having a concave spherical surface whose center is that of said ball, said surface engaging said handle, another engaging the projecting means of said control member in a plane containing said third axis and one of said first-named two axes, and the third engaging the projecting means of said control member in a plane containing said third axis and the other of said first-named two axes.

LOUIS B. COURTOT.

REFERENCES CITED

The following references are of record in the file of this patent:

UNITED STATES PATENTS

| Number | Name | Date |
|---|---|---|
| 1,987,733 | Fonbrune | Jan. 15, 1935 |
| 2,082,410 | McCauley | June 1, 1937 |
| 2,122,306 | Volz et al. | June 28, 1938 |

FOREIGN PATENTS

| Number | Country | Date |
|---|---|---|
| 373,144 | Italy | July 20, 1939 |